Dec. 15, 1942.  G. SMITH  2,305,393
LOADING APPARATUS
Filed Sept. 14, 1940  3 Sheets-Sheet 1

INVENTOR
GILBERT SMITH
BY Ralph L. Bassett
ATTORNEY

Dec. 15, 1942.                    G. SMITH                    2,305,393
                              LOADING APPARATUS
                         Filed Sept. 14, 1940            3 Sheets-Sheet 2

Inventor
GILBERT SMITH
By Ralph S Bassett
Attorney

Dec. 15, 1942.   G. SMITH   2,305,393
LOADING APPARATUS
Filed Sept. 14, 1940   3 Sheets-Sheet 3
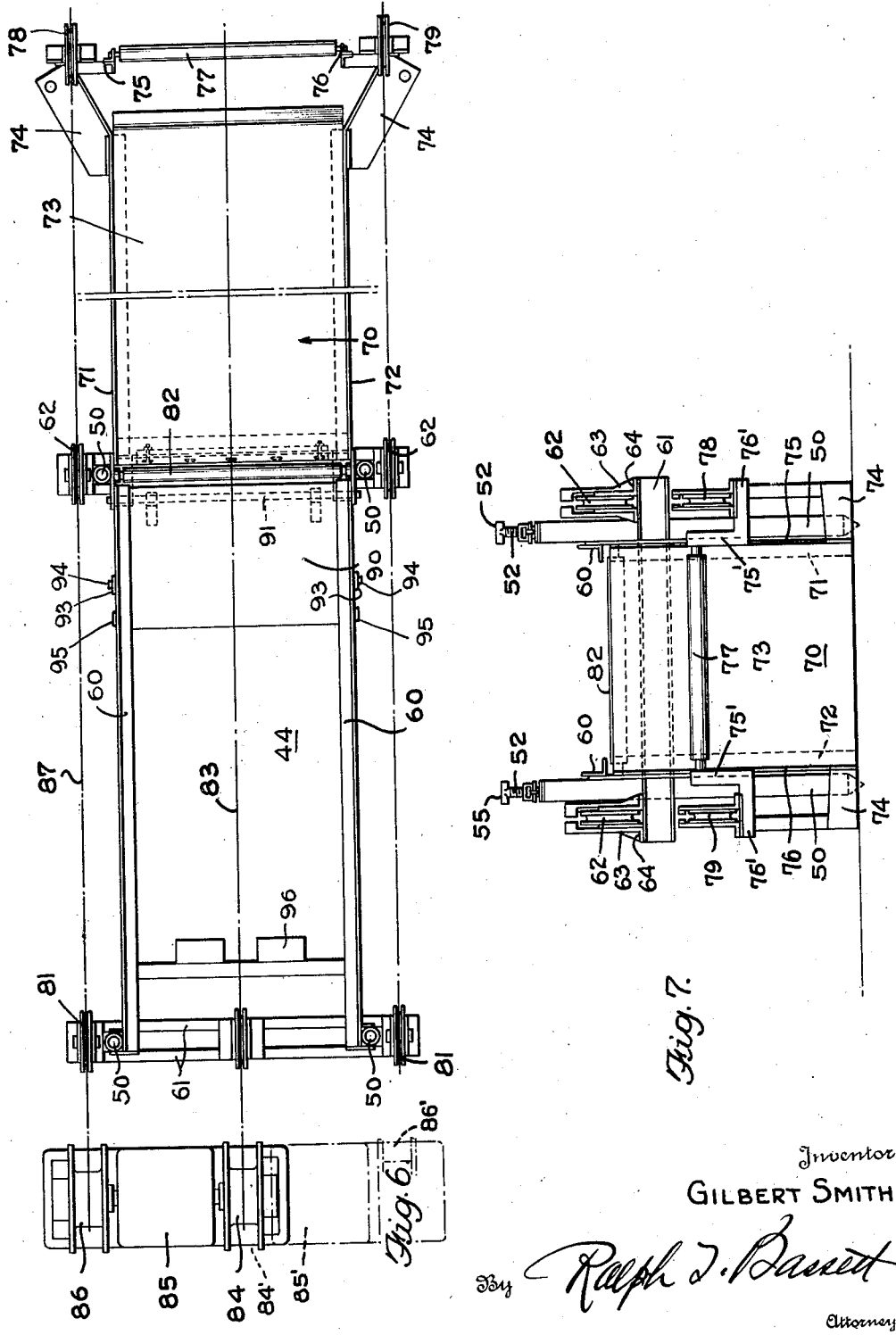
Inventor
GILBERT SMITH
By Ralph J. Bassett
Attorney Patented Dec. 15, 1942

2,305,393

UNITED STATES PATENT OFFICE 2,305,393

LOADING APPARATUS

Gilbert Smith, Fayetteville, W. Va.

Application September 14, 1940, Serial No. 356,879

10 Claims. (Cl. 254—190)

This invention relates to improvements in that type of loading apparatus disclosed in my Patent No. 2,138,750, issued November 29, 1938.

One of the objects of my invention is to provide a loading apparatus in which the cable actuated pan or scoop is both self-aligning and self-centering and its travel is close to and at any angle along a cut of coal or ore to be loaded.

A further object of the invention is to provide means for moving the pan or scoop from loading to unloading position, around any corner or angle, without the aid of troughing, permanently placed guides, tracks, or other conventional means for accomplishing this end.

A further object of the invention is to provide means for manipulating the scoop or pan adjacent the working faces of a mine, regardless of their angular arrangement, by providing at suitably spaced points a deflector which will create the essential guiding movement to secure the desired results, the operation of the scoop or pan being in response to power from a suitable source transmited by means of a cable from the loading point to the unloading mechanism.

A still further object of the invention is to provide an assembly which will eliminate the noise at the face. This is a big factor in bad tops as an operator can hear a roof movement with the present assembly whereas with other mechanical loading or conveying equipment involving motor assemblies and moving parts the sound of the roof movement is usually not noticeable, thus the present arrangement provides an important safety factor.

A further object resides in the provision of a structure for loading coal and ore wherein timbering can be more closely arranged and wherein pitches, rises or dips do not in any way affect the operation.

Other objects will more clearly hereinafter appear by reference to the accompanying drawings forming a part of the specification and wherein like characters of reference designate corresponding parts throughout the several views in which:

Fig. 6 is a top plan view of a dumping apparatus, and

Fig. 7 is an end elevation.

Figure 1:
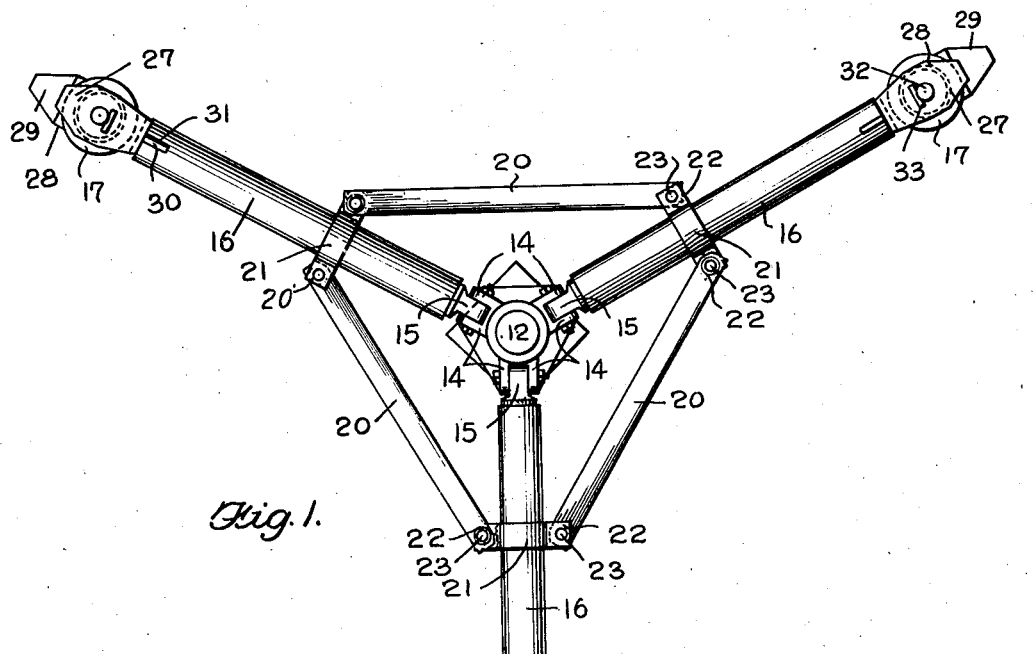
Fig. 1 is a top plan view of the deflector unit.
Figure 2:
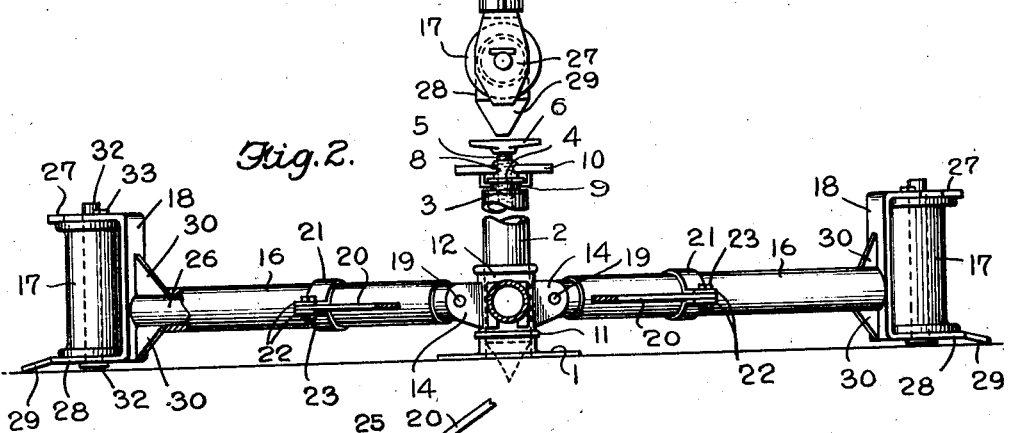
Fig. 2 is a side elevation with parts broken away in section.
Figure 3:
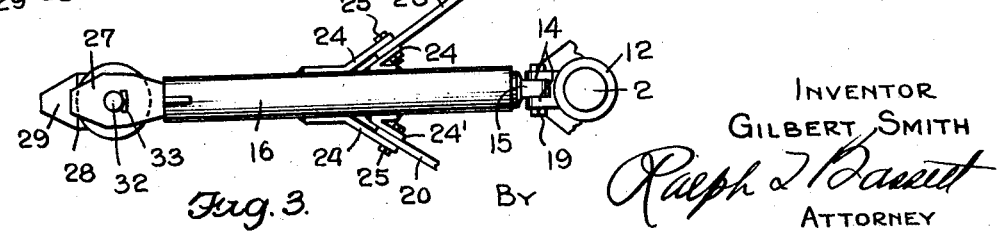
Fig. 3 is a fragmentary section showing one of the rotating arms of the deflector unit.

The main feature embodied in the present development is the construction of a deflector for engaging and guiding the cable used in the manipulation of the scoop or pan from loading to unloading position. The deflector embodies a jack element comprising a base 1 and a vertical tubular standard 2, the proportions of these parts being varied according to the nature of the mine in which they are to be utilized and the size of the scoop or pan and its load capacity. The vertical tubular standard 2 of the jack includes a fixed cap 3 having an annular flange 4, the cap being formed with a vertical opening concentrically arranged with respect to the standard 2 for the reception of the downwardly extending threaded stem 5 of the adjusting head 6. A threaded nut 8 engages with the threaded stem 5 and is secured against vertical movement by inwardly extending lugs 9 which engage the annular flange 4 of the cap 3. Arms 10 facilitate the rotation of the nut 8 on the threaded stem 5 and due to the use of the locking lugs 9 this nut is retained against vertical movement, thus bringing about the vertical adjustment of the stem 5 and the head 6 for clamping the jack in fixed position between the ceiling and floor of a mine. The vertical standard 2 is provided with an annular flange or shoulder 11 adjacent the base 1, the location of this flange being determined by the required construction and arrangement of the radiating arms and related parts and the necessity of having these arms and related parts in a relatively low predetermined position with respect to the mine floor and the base of the pan or scoop, to insure the proper manipulation of the latter. Should it be found that the flange 11 is not at an elevation suitable for a proper manipulation a certain type of pan, washers or bearings could readily be supported on this flange or collar to adjust the structure with respect to the mine floor. Rotatably arranged on the vertical tubular stem 2 and seating on the shoulder 11 is the hub 12. The hub 12 is provided with a plurality of pairs of radiating spaced ears 14 for the reception of the reduced extremity 15 of the radiating arms 16 which support at their extremity the guide spools 17 by virture of the bifurcated structure 18 as will be hereinafter more fully described. The radiating arms 16 are pivoted by means of the bolt 19 for vertical movement and the various radiating arms 16 are braced by connecting links 20. The links 20 are secured by any suitable means intermediate the extremities of the arms 16. In Figures 1 and 2 the connection for the braces 20 is shown in the nature of clamps 21 formed of sections having parallel projecting ears 22 through which bolts 23 extend for clamping the extremities of the braces 20 between said ears in a manner to permit only a relative limited movement between the arms and the braces. Such a relative movement may be brought about by a relatively loose connection between the parts such as may be secured by having the bolt openings 20' slightly larger than the diameter of the bolt or by slotting the bolt opening in the connecting elements 20, it being sufficient that these parts may be individually adjusted themselves during operation or be simultaneously adjusted if occasion requires. In Fig. 3 the braces 20 are illustrated as secured between the angular ears 24 and 24' which are welded to the radiating arm 16 in spaced relation and secured to the braces 20 by virtue of the bolts 25. This connection, as in the preceding instance providing for limited free and independent movement of the associated parts. This arrangement provides for a simultaneous movement of the radiating arms which in the present illustration are shown to be three in number, thus providing maximum space for the movement of the scoop or pan between the radiating arms during operation of the device adjacent walls of angular form, in which positions maximum allowance must be made for the reception of the pan between the arms. As previously stated the end of each radiating arm is provided with a bifurcated structure 18 including superimposed parallel arms between which the spools 17 are arranged on suitable bearings. The bifurcated element 18 forming the spool suporting structure includes a tubular shank 26 to the outer end of which is fixed an elongated strap at a point substantially intermediate its length. The strap is bent to form the upper horizontal extension 27 and lower horizontal extension 28. It will be noted that in bending the strap to form the upper and lower extensions, the upper bend is made at a greater distance from the shank 26 than the bend forming the lower projection thus reducing the length of the upper projection with respect to the lower projection. The portion of the lower projection 28 extending beyond the upper projection 27 is bent downwardly at 29 to provide a ground engaging lip or contact element which will guard against the misalignment of the rope and its escape from the spool into a position which might cause the dislodgment of the jack. The upper projecting portion 27, it will be noted, extends beyond the spool 17, when the latter is in position and thus means are provided which assist against the escape upwardly of the cable from the surface of the spool upon which the cable operates. Braces 30 connect the upright portion of the strap with the shank 26 to reinforce these parts and retain them in rigid relation with respect to each other. These braces 30 likewise operate to position and retain the spool 17 in vertical position by engaging in the slots 31 formed in vertical alignment in the outer extremities of the arms 16. The spools are suitably mounted on bearings, such as roller bearings and retained into position by the pins 32 which extend through aligned perforations in the projections 27 and 28. The pins 32 are fixed by cotter pins or other fastening 33. The lip 29 thus acts in the nature of a drag line pick-up and the spool accommodates the line during movement of the latter, thus the combined parts fully control the action of the cable or drag line in guiding, deflecting and pick-up and the universal flexibility of the assembly facilitates these functions.

From the foregoing it will be obvious that an extremely useful device has been provided for the purpose specified. In constructing the device the hub is preferably formed of cast steel and on to this is attached three arms, these arms having a cast steel head into which is placed the flanged roller. The head includes the upper and lower arms and the roller is positioned inwardly of the extremity of these arms and is mounted on antifriction ball bearings. The arms 16 are braced one from the other by means of the brace elements 20. When in use the rope or cable is always playing on two of these rollers 17 thus making it self-alining or self-centering. The upper bifurcated arm 27 by extending outwardly beyond the roller prevents the hub or cable from coming off in instances where the device is used on steep pitches or grades either up or down. The lower lips 29 which extend outwardly and downwardly from the arm 28 prevent the hub from sliding under the arm and provide a support for holding the parts in their relative position in instances where the mechanism is positioned from an irregular surface. The fact that the arms are bolted or hinged to the hub permit the raising and the lowering of these arms and enable the bottom lip 29 to always ride on the irregular floor surface.

Figure 4:
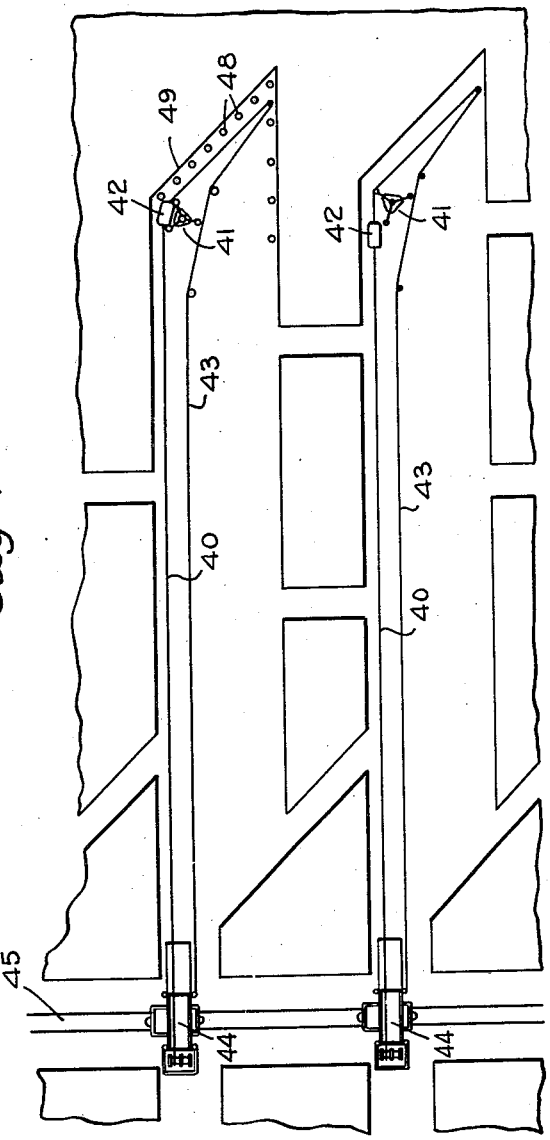
Fig. 4 is a plan view of a mine layout with the present loading and unloading unit in position.
Figure 5:
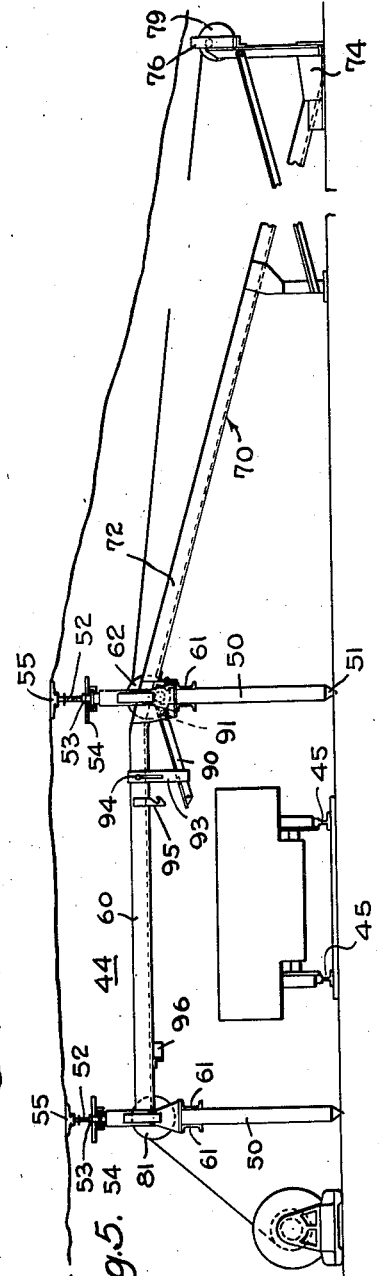
Fig. 5 is a side elevation of a dumping apparatus.
Figure 5A:
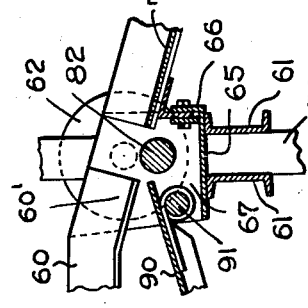
Fig. 5a is a transverse section showing the details of construction of a portion of the dumping apparatus.

The deflector for handling the car loader or pan is adaptable for use in many types of mines and is primarily designed to eliminate trackage and permit substantially closer timbering than is practical with other mechanical methods of loading. Fig. 4 illustrates a single track entry layout in which the head rope is indicated at 40, deflector at 41, the pan passing around the deflector at 42 and the tail rope 43. The ropes or cables 40, 43, extend to the dump assemblies indicated generally at 44. These dump assemblies including the cable connections are shown in detail in Fig. 5.

It is to be noted that while the present drawings illustrate in Fig. 4 a lay-out utilizing only a single deflector, nevertheless, the same apparatus may be utilized at any number of corners or from any number of working places, to single loading and unloading points, without the aid of any troughing, permanent placed guides, tracks or analogous structures.

What I claim as new and useful and desire to secure by Letters Patent is:

1. A guiding apparatus for association with cable actuated loaders, a vertical center post having a bearing portion, a hub provided with vertical swinging arms rotatably mounted on the bearing portion of said post, means connecting adjacent arms intermediate their length, bifurcated spool supports carried by the outer extremities of said arms, spools rotatably mounted in said supports and ground engaging extremities carried by each of said spool supporting member.

2. A guiding and manipulating apparatus in association with cable actuated loader pans, including in combination a vertical post having an intermediate bearing portion, an adjustable ceiling engaging member carried by one end of the post, a hub rotatably mounted on the bearing portion of said post, vertically swinging arms pivoted to said hub at spaced points in its periphery, spools carried at the outer extremities of said arms, and means extending downwardly and outwardly from the end portions of said arms for normal engagement with a supporting surface.

3. A control device for association with a cable operated loader pan, comprising in combination, a central standard formed with a bearing portion and an adjacent supporting portion, a hub mounted on the bearing portion carried by said supporting portion, a plurality of radiating spaced pairs of ears extending from said post, vertically swinging arms hinged between each pair of spaced ears for vertical swinging movement, means connecting said arms, said means permitting simultaneous limited swinging movement of the arms, and spools carried by the extremities of said arms.

4. The structure of claim 3 characterized in that the standard is provided with an adjustable engaging portion for permitting clamping engagement between a floor and ceiling.

5. The structure of claim 3 characterized in that the spools are connected to the arms by bifurcated supports, which latter include downwardly extending ground contacting lips.

6. A guide member for mine scoops comprising a center standard having a vertically adjustable upper extremity, a freely rotating hub mounted on said standard, vertical swinging arms pivoted to the hub, means connecting said arms for permitting simultaneous limited movement of said arms, and guide means carried at the extremities of said arm.

7. A guide member for mine scoops comprising a vertical standard having an adjustable upper end, a freely rotating hub, means for preventing downward movement of said hub, a plurality of arms hinged for vertical movement carried by said hub, the extremity of said arms including a downwardly extending ground engaging portion, and rotatable guide means carried by each arm above and inward of said ground engaging portion.

8. A deflector for guiding a cable actuated drop bottom pan from a working face to a pit comprising a standard having its extremity formed with gripping faces and its intermediate portion extensible, a hub rotatably mounted on said standard, radiating spaced vertically swinging arms carried by said hub, means connecting said arms intermediate their length whereby their swinging movement may be simultaneous, a guiding spool carried by the extremity of each arm, guide means connected to and extending downwardly from said arms, and means for preventing axial movement of said hub on said standard.

9. A guide member for mine scoops including a vertical standard, a freely rotatable hub on said standard, means for retaining said hub on said standard, a plurality of spaced arms pivoted on said hub for vertical swinging movement, and spacers extending between and connected at their extremities to said arms, said connections being relatively loose whereby said arms are relatively free for limited independent movement.

10. A guide member for mine scoops including a vertical standard, a freely rotatable hub on said standard, means for retaining said hub on said standard, spaced arms hinged to said hub for vertical swinging movement, the free extremities of said arms being bifurcated, spools mounted inward betwen the bifurcated portions of said arms, and spacers loosely connected at their extremities to said arms at points intermediate of their length, whereby said arms are capable of limited independent relative movement.

GILBERT SMITH.